Jan. 4, 1966
A. W. LO ET AL
3,227,890
PARAMETRIC OSCILLATOR
Filed Dec. 22, 1960
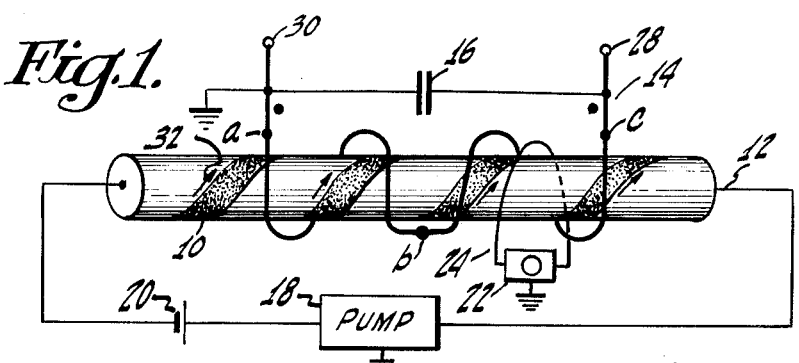
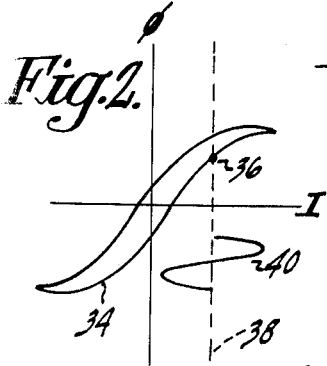
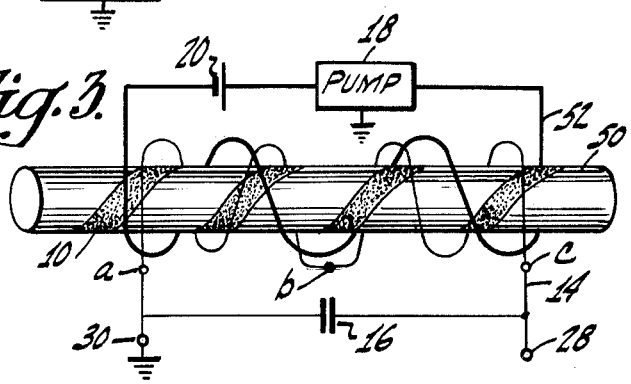
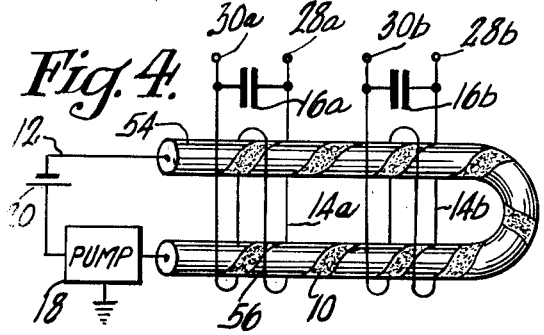
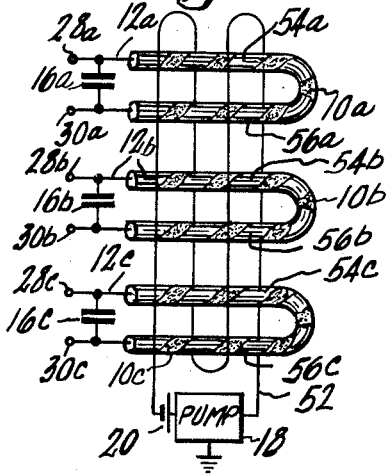
INVENTORS.
ARTHUR W. LO
& LUBOMYR S. ONYSHKEVYCH
BY
John V. Regan
ATTORNEY United States Patent Office 3,227,890
Patented Jan. 4, 1966

3,227,890
PARAMETRIC OSCILLATOR
Arthur W. Lo, Poughkeepsie, N.Y., and Lubomyr S. Onyshkevych, Cambridge, Mass., assignors to Radio Corporation of America, a corporation of Delaware
Filed Dec. 22, 1960, Ser. No. 77,687
6 Claims. (Cl. 307—88)

This invention relates to parametric subharmonic oscillators and, more particularly, to parametric subharmonic oscillators employing variable inductance elements.

Parametric subharmonic oscillators, their characteristics and mode of operation have been described in various publications. It has been suggested that ferrite cores be used as variable inductance elements in such oscillators. However advantageous the use of cores may be in some applications, the maximum operating frequency of such elements is limited to a relatively low value to prevent overheating of the cores. The obtainable frequency may be increased by reducing the size of the cores. However, a practical limit of size reduction is reached at which it becomes difficult and expensive to wind the input and output windings on the cores.

Accordingly, it is an object of this invention to provide improved parametric subharmonic oscillators employing variable inductance elements.

It is another object of this invention to provide improved parametric subharmonic oscillators which employ variable inductance elements and which have a higher operating frequency than is obtainable with parametric subharmonic oscillators which employ ferrite cores.

It is still another object of this invention to provide parametric subharmonic oscillators employing variable inductance elements which have small hysteresis and eddy current losses.

It is yet another object of this invention to provide parametric subharmonic oscillators employing variable inductance elements which are simple in construction and inexpensive.

These and other objects are accomplished according to one embodiment of the invention by an insulated conductor, a thin ribbon of high permeability material wound helically around the insulated conductor with adjacent turns of the ribbon being spaced apart from each other, a winding linking the conductor and ribbon, means for applying alternating current (A.C.) energizing signals of frequency $f$ to either the conductor or the winding, and means connected with the other of the conductor and winding to form a tank circuit which has a natural resonant frequency which is close to a desired subharmonic of the energizing signal frequency $f$. The nonlinearity of the high permeability material provides a variable inductance for parametric operation of the circuit.

In the accompanying drawing, like reference numerals refer to like components, and:

FIGURE 1 is a diagram of one embodiment of the invention, wherein the variable inductance element is a thin ribbon of high permeability material wound helically around a substantially straight, insulated conductor;

FIGURE 2 is a $\phi$-I characteristic of a suitable high permeability material for use in practicing the invention;

FIGURE 3 is a modification of the FIGURE 1 embodiment;

FIGURE 4 is a diagram of the invention wherein the insulated conductor is bent, after the ribbon is wound, to form two separated and juxtaposed legs, and wherein windings for more than one resonant circuit link the bent conductor, and;

FIGURE 5 is a diagram of another embodiment of the invention wherein each of a plurality of bent or folded conductors forms the variable inductance element of a different tank circuit, and wherein a single pump winding links each of the bent conductors.

A parametric subharmonic oscillator consists essentially of a tank circuit having a natural resonant frequency $f_0$. If one of the reactances in the tank circuit is varied at a frequency $f$ by an alternating current signal from an energizing source, often referred to as the "pump," an effective negative conductance appears across the tank circuit under certain conditions. If the frequency at which the reactance is varied bears a certain relationship to the natural resonant frequency $f_0$, oscillations build up parametrically in the tank circuit and are sustained so long as the amplitude of the energizing signal exceeds a certain critical value. Parametric oscillations, as is known, may be sustained at various subharmoncs integrally related to the pump frequency, and the phase of oscillations is locked in a certain relation to that of the energizing signal.

In particular, the tank circuit may be adjusted to oscillate parametrically at one-half the pump frequency in a binary system, whereby parametric oscillations are sustained in either of two distinct and stable phases. The two phases are 180° apart at the same frequency and may represent, respectively, binary "one" and binary "zero." Once the tank circuit starts to oscillate in either of the two stable phases, it continues to do so until forcibly stopped or until the pump signal is interrupted. The oscillations may be steered initially into a desired one of the two phases by applying a small locking signal at the oscillating frequency to the tank circuit during, or slightly prior to, the time that oscillations first start to build up. A more detailed description of the physical and operating properties of parametric oscillators is given in an article entitled, "Parametric Phase Locked Oscillator—Characteristics and Applications to Digital Systems," in the September, 1959, issue of the IRE Transactions on Electronic Computers at pages 282–283, and in other publications. For descriptive purposes, such oscillators are referred to hereinafter as "phase locked oscillators," or "PLO's."

It has been suggested that the variable reactor of a PLO take the form of two ferrite cores. Such cores are characterized by low leakage flux and low eddy current losses. However, cores have a large ratio of volume-to-surface area with resulting low heat dissipation. The heat generated in a core is a function of the operating frequency. As is known, the magnetic properties of a magnetic material change drastically in the region of the Curie point, and the temperature of the material must not reach a value at which such changes set in. Artifical cooling is sometimes used to permit higher operating frequencies for magnetic cores. However, the maximum operating frequency for a given environment of a core must be limited to a relatively low value to avoid overheating.

In general, the upper frequency limit of a PLO employing ferrite cores may be increased by decreasing the size of the cores. This also implies a decrease in the size of the core apertures. A practical limit of small core size is reached below which it becomes difficult to thread the necessary windings through the small aperture. Moreover, cores of such small size are generally hand wound, which becomes expensive in an application where numerous cores are required, such as in modern information handling systems.

The upper frequency limit of a PLO may be increased in accordance with the present invention by utilizing the bulk effect in a metallic magnetic material to obtain variable inductance. More particularly, the variable inductance element contemplated has the form of helically wound thin tape or ribbon comprising a metallic magnetic alloy having a high permeability. By "high permeability" is meant, for example, a specific permeability of 30,000 or higher. A desired material is one also possessing a low coercive force, for example less than one oersted, and having a non-linear B-H characteristic preferably of the linear or "S" type, and in any event, having a low area hysteresis loop.

It will be recognized that the above-mentioned characteristics are those possessed by some known metallic alloys. One suitable and preferred material for use in practicing the invention is of the class known in the art as 4–79 molybdenum permalloy. By using a thin metallic alloy rather than a ferrite, the benefits of a high permeability, low resistance material are enjoyed over the disadvantages of a low permeability, high resistance material. The low resistance of the alloy is offset by the use of a very thin geometry. By "thin" is meant less than one mil, and in practice the material is made as thin as possible consistent with structural stability. A very thin member of such material has low hysteresis losses because of the small volume and also low eddy current losses. Heating of the material is small in a thin member because of the high surface-to-volume ratio, permitting high frequency operation. Open loop operation of the magnetic circuit eliminates the expensive operation of threading a core, and the ease of fabrication, which will be more fully apparent hereinafter, renders the manufacturing of the device particularly well-suited to mass production techniques.

One embodiment of an improved PLO according to the invention is illustrated in FIGURE 1. The PLO comprises a thin tape or ribbon 10 of high permeability material wound spirally, or helically, around a flexible, insulated conductor 12. By "helically" wound is meant the adjacent turns of the ribbon 10 are axially displaced from one another. The adjacent turns are separated from one another by a space, as illustrated in FIGURE 1 and all other figures of the drawing.

A second conductor, or winding 14, is wound around the first conductor 12 and ribbon 10 in two series-opposed sections. The first section a-b is wound counterclockwise around the insulated conductor 12, and the second section b-c is wound clockwise for reasons which will be described more fully hereinafter. A capacitor 16 is connected across the ends of the external winding 14 to form a parallel resonant circuit. Alternatively, the capacitor 16 could be connected in series with the winding 14 to form a series resonant circuit. The insulated conductor 12 is connected to an A.C. pump source 18 through a D.C. biasing source, illustrated as a battery 20.

The pump 18 may be, for example, a triode oscillator or other suitable source of A.C. signals. The inductance of the tank winding 14 is varied at the frequency of the pump signals because of the non-linear properties of the ribbon 10. The range of inductance variation is a function of the amplitude of the pump signals and the characteristics of the ribbon 10 content. The value of the capacitor 16 is chosen so that the tank circuit has a natural resonant frequency (in the absence of pump signals) at or close to a desired harmonic or subharmonic of the pump frequency. More particularly, the value of the capacitor 16 is chosen so that parametric oscillations are sustained at the desired frequency when the inductance of the tank winding 14 is varied at the pump 18 frequency. The first subharmonic is desired when the PLO is used in a binary system, for reasons described hereinabove.

Parametric oscillations build up in the tank circuit at the selected pump subharmonic in response to a negative conductance presented to the tank circuit by the varying inductance. The phase of the parametric oscillations is determined by signals or noise present in the tank when the pump signals are applied. The phase may be predetermined by inducing a locking signal in the tank prior to, or during the time that parametric oscillations start to build up. The locking signal has the same frequency as the parametric oscillations and is of the desired phase. In FIGURE 1, an external oscillator 22 is provided for this purpose, and the output of the oscillator 22 is coupled to the tank by means of a winding 24.

The pump 18 signals also are coupled to the tank winding 14 by transformer action, and a voltage at the pump 18 frequency is induced in the tank winding 14. The winding 14 is preferably wound in two series-opposed sections, as indicated by the conventional dot markings, to provide cancellation of this voltage. Of course, cancellation may be achieved in the absence of the opposed winding 14 sections by connecting a filter (not shown) at the output terminals 28, 30, one of which is shown connected to circuit ground.

It will be recognized that a portion of the flux path for the winding 14 is external to the ribbon 10, that is to say, through the air. The high reluctance of the air, however, is offset by the high permeability of the ribbon 10, and a large change in inductance is provided in response to the pump signals. The ribbon 10 has an easy direction of magnetization along the length thereof, in a direction indicated by the arrows 32. The area factor, i.e., the ratio of the cross-sectional area of the ribbon 10 to the cross-sectional area of the air between the ribbon 10 and the winding 14 may be improved by using printed circuit techniques for establishing the tank winding 14. A good area factor corresponds to a high value of $\Delta L/L$ and, hence, to a fast build-up of parametric oscillations, where $\Delta L$ is the range of inductance variation and $L$ is the fixed inductance due to air.

It will be understood by those skilled in the art that the insulated conductor 12 may be used as the tank inductor by connecting the capacitor means 16 in circuit with the isulated conductor 12. In this event, the winding 14 would be connected to the pump 18 and D.C. bias source 20. Such an arrangement is illustrated in FIGURE 5, to be described, and is within the purview of the invention. It will be understood, in view of other embodiments to be described, that several tank windings may be helically wound on the same insulated conductor 12.

A $\varphi$-I characteristic curve 34 for a suitable high permeability material is illustrated in FIGURE 2. The material has preferably a low area hysteresis loop, as illustrated in the drawing. The build-up time of parametric oscillations in the tank circuit of FIGURE 1 is a function of the percent change in inductance occasioned by the pump signal. It is desirable, therefore, that the ribbon 10 be biased to an optimum point of non-linearity, as indicated by the point 36 of intersection of the dashed vertical line 38 with the characteristic curve 34 in FIGURE 2. The ribbon 10 operates along a minor hysteresis loop in response to pump signals 40. The material content of the ribbon 10 and the mechanical stressing of the ribbon 10 are chosen so as to obtain a variable inductance preferably without providing a square hysteresis loop.

A modification of the FIGURE 1 PLO is illustrated in FIGURE 3. In the modified embodiment, the ribbon 10 or tape is wound helically along the length of an insulated supporting member 50, which may be, for example, a ceramic cylinder. The tank winding 14 is arranged as in the FIGURE 1 embodiment, and a capacitor 16 is connected in circuit with the winding 14 to form a resonant circuit. A second winding 52 links the ribbon 10 externally, and is connected in circuit with a D.C. source 20 and the pump 18. As an alternative to the use of a D.C. biasing source 20, in this and the other figures of the drawing, a fixed permanent magnet (not shown) may be provided to "bias" the magnetic material to an optimum operating point. Operation of the FIGURE 5 PLO is similar to that of the FIGURE 1 embodiment and need not be described.

Another embodiment of the invention is illustrated in FIGURE 4. The metallic ribbon 10 of high, non-linear permeability is wound helically around the insulated conductor 12 in a lengthwise direction while the conductor 12 is in an elongated position. Adjacent turns of the ribbon 10 are spaced apart and separated by air. The insulated conductor 12 is then bent, as illustrated, into a substantially U-shaped geometry having two separated, juxtaposed legs 54, 56. Several separate tank windings, such as the windings 14a, 14b, are then wound unidirectionally around the U-shaped member, and capacitors 16a, 16b are connected, each to a different one of the windings 14a, 14b, respectively, to form individual tank circuits. It is unnecessary to wind each of the output windings 14a, 14b in two series-opposed sections because the voltages induced in the windings 14a, 14b by the pump current flowing through the two sections 54, 56 of conductor 12 are in a sense to cancel each other. Locking signal sources, such as the oscillator 22 of FIGURE 1, may be added to the FIGURE 4 circuits, if desired.

In one device constructed in accordance with FIGURE 4, the ribbon 10 was one-quarter of a mil thick, one-quarter of an inch wide, and comprised 4–79 molybdenum permalloy. The insulated conductor had a diameter of one-tenth inch, and the tank winding 14 consisted of 30 turns of wire. The pertinent properties of a PLO, such as two stable phase states and snap action, were observed over a wide range of pump frequencies. "Snap action" may be defined as the sudden jump into or out of oscillation with variation of pump amplitude or D.C. bias.

FIGURE 5 illustrates three PLO's driven from a single pump source 18, the particular number of PLO's being illustrative only. Each PLO comprises an insulated conductor 12 having a ribbon 10 of high permeability material wound helically thereon. The insulated conductor 12 is bent into a substantially U-shaped configuration subsequent to the winding of the ribbon 10. Each insulated conductor 12 has a separate capacitor connected in circuit therewith to form a tank circuit which oscillates parametrically when energized from a pump source 18. The pump winding 52 is wound unidirectionally around all of the U-shaped members 12a . . . 12c and is connected to the pump source 18 by way of a battery 20.

What has been illustrated and described are several embodiments of improved phase locked oscillators employing variable inductance elements. These PLO's are easy to fabricate and are inexpensive because of the open-type magnetic circuit construction. The variable inductors can be mass produced in long sections and the windings wound thereon using printed circuit techniques. Thereafter, individual elements can be cut from the long section as desired. The thin ribbon itself may be deposited using known evaporation techniques.

What is claimed is:

1. The combination comprising: a first, insulated conductor, a thin ribbon of high permeability material wound helically around said insulated conductor with adjacent turns of said ribbon being spaced apart from each other, the helically wound ribbon having a substantially "S" type B-H characteristic, a second conductor wound around said insulated conductor and said ribbon, means for applying to one of the first and second conductors A.C. signals having a frequency $f$, and means connected to the other of the first and second conductors to form a circuit resonant at a frequency close to a subharmonic of said frequency $f$.

2. The combination comprising: a helix of thin, high permeability material, adjacent turns of said helix being axially spaced from one another; said helix of material having a substantially linear type B-H characteristic; first and second conductors linking said material; means for applying to one of said conductors A.C. signals having a frequency $f$; and means connected with the other of said conductors to form a resonant circuit having a natural frequency close to a subharmonic of said frequency $f$.

3. A parametric circuit comprising, in combination: a first, insulated conductor; a thin ribbon layer of high permeability, non-linear material helically positioned lengthwise around said insulated conductor with adjacent lengthwise portions being spaced apart from one another; the helically wound ribbon having a substantially "S" type B-H characteristic; a second conductor wound around said first conductor and having two sections wound in series-opposition; means for applying to one of the conductors A.C. signals having a frequency $f$; and means connected with the other of the conductors to form a resonant circuit having a natural resonant frequency close to a subharmonic of said frequency $f$.

4. The parametric circuit as claimed in claim 3 including means for applying a D.C. bias to said one of the conductors.

5. A parametric circuit comprising, in combination: a first, insulated conductor; a thin ribbon of high permeability, non-linear material wound in the form of a helix around said insulated conductor with adjacent turns of said ribbon being spaced apart from each other, said helix of material having a substantially linear B-H characteristic, said insulated conductor and said wound ribbon being bent to provide two spaced-apart, juxtaposed legs; a second conductor physically linking both of said legs; means for applying to one of said conductors A.C. pump signals having a frequency $f$; and means connected with the other of said conductors to form a tank circuit having a natural resonant frequency close to a subharmonic of said pump frequency $f$.

6. The combination comprising a plurality of substantially U-shaped insulated conductors, each of said conductors having wound helically thereon a separate thin ribbon of high permeability material, adjacent turns of each said ribbon being spaced apart from each other; each helically wound ribbon having a substantially "S" type B-H characteristic; a winding linking all of said U-shaped conductors; means for applying to said winding A.C. signals having a frequency $f$; and separate means each connected with a different one of said conductors to form a like plurality of circuits resonant at a subharmonic of said frequency $f$.

References Cited by the Examiner

UNITED STATES PATENTS 3,051,891  8/1962  Jorgensen _____ 307—88

OTHER REFERENCES

Pages 110–115, 307–88P, April 4, 1959, publication I: Control Engineering.

Pages 38S–42S, April 1959, publication II; Journal of Applied Physics, supplement to vol. 30, No. 4.

IRVING L. SRAGOW, *Primary Examiner.*